(12) United States Patent
Hauge

(10) Patent No.: US 7,306,437 B2
(45) Date of Patent: Dec. 11, 2007

(54) PRESSURE EXCHANGER

(76) Inventor: Leif Hauge, 1808 Eden Way, Virginia Beach, VA (US) 23454

( * ) Notice: Subject to any disclaimer, the term of this patent is extended or adjusted under 35 U.S.C. 154(b) by 0 days.

(21) Appl. No.: 11/200,238

(22) Filed: Aug. 10, 2005

(65) Prior Publication Data

US 2006/0032808 A1 Feb. 16, 2006

Related U.S. Application Data

(60) Provisional application No. 60/599,760, filed on Aug. 10, 2004.

(51) Int. Cl.
*F04F 11/00* (2006.01)
*F02C 3/02* (2006.01)
*B01D 61/00* (2006.01)
(52) U.S. Cl. .................. 417/64; 60/39.45; 210/652
(58) Field of Classification Search .............. 417/64; 60/39.45; 73/862.324; 210/652
See application file for complete search history.

(56) References Cited

U.S. PATENT DOCUMENTS

| 2,399,394 | A | * | 4/1946 | Seippel | 60/39.45 |
| 3,084,511 | A | * | 4/1963 | Klapproth | 60/39.45 |
| 3,374,942 | A | * | 3/1968 | Seippel | 417/64 |
| 4,887,942 | A | | 12/1989 | Hauge | |
| 5,274,994 | A | * | 1/1994 | Chyou et al. | 60/39.45 |
| 5,338,158 | A | | 8/1994 | Hauge | |
| 5,988,993 | A | | 11/1999 | Hauge | |
| 6,439,209 | B1 | * | 8/2002 | Wenger et al. | 123/559.2 |
| 6,460,342 | B1 | * | 10/2002 | Nalim | 60/772 |
| 6,537,035 | B2 | * | 3/2003 | Shumway | 417/64 |
| 6,540,487 | B2 | | 4/2003 | Polizos et al. | |
| 6,659,731 | B1 | * | 12/2003 | Hauge | 417/64 |
| 2002/0125190 | A1 | * | 9/2002 | Bosley | 210/642 |

* cited by examiner

*Primary Examiner*—Anthony D. Stashick
*Assistant Examiner*—Jessica L Frantz
(74) *Attorney, Agent, or Firm*—Hunton & Williams

(57) ABSTRACT

A pressure exchanger for transferring pressure energy from a high-pressure fluid stream to low-pressure fluid stream. A ducted rotor is positioned on a central axle between two end covers inside the vessel with a coaxial inlet and outlet pair that is in communication with a pair of low pressure ports having inclination forming an inlet tangential velocity vector in the direction of rotor rotation and an outlet tangential velocity vector in opposite direction imparting a rotational momentum on rotor. A pair of high-pressure ports is adapted for flow without inclination and imparts no momentum to the rotor. The end covers have a sloped surface following a flat sealing area that increases the clearance in the direction of rotation causing increased outflow during depressurization and lower duct pressure. This also causes increased inflow during the pressurization phase which will dissipate pressure energy as opposed to producing cavitation or pressure waves.

19 Claims, 5 Drawing Sheets

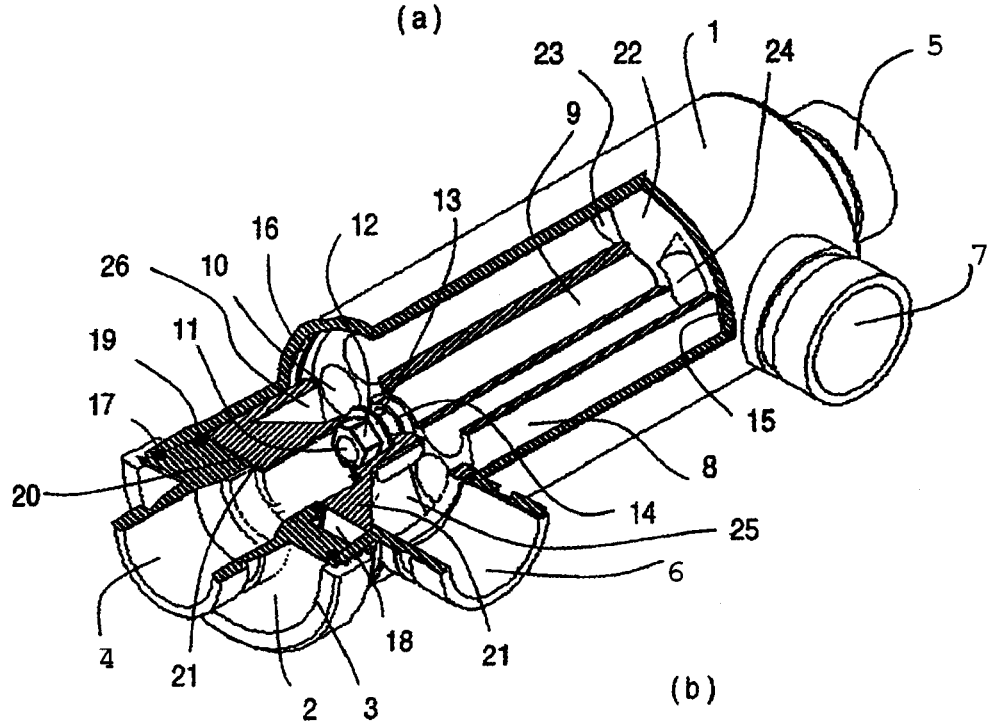
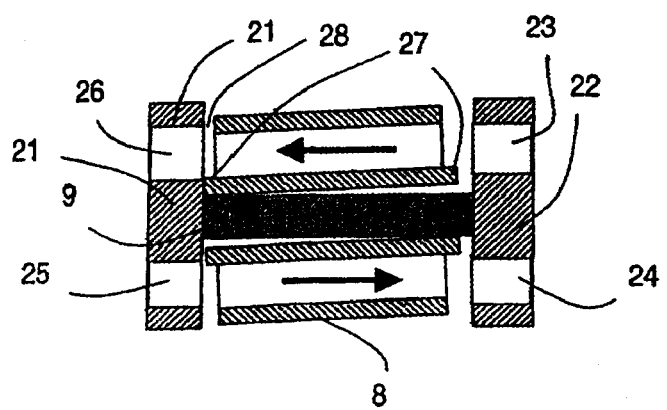

FIGURE 3
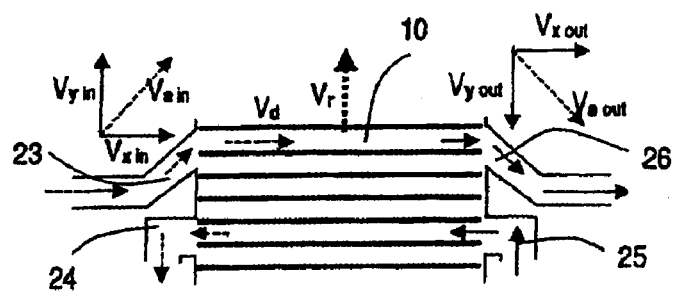
FIGURE 4
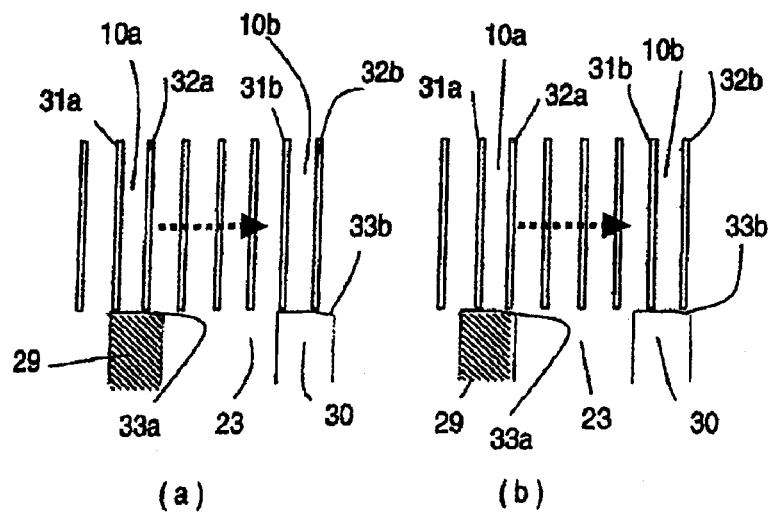
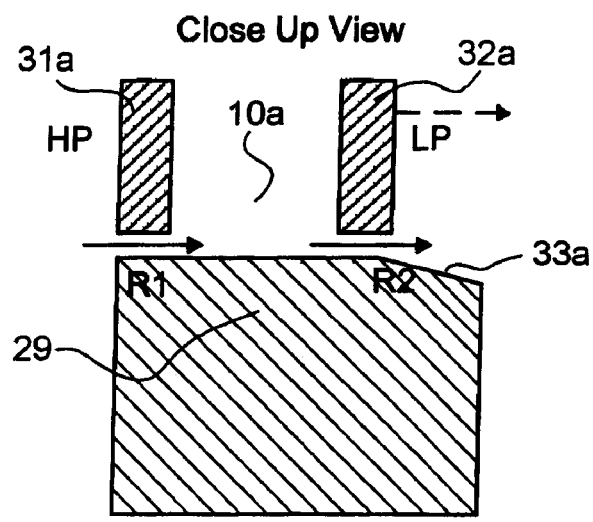

FIGURE 5
(a)
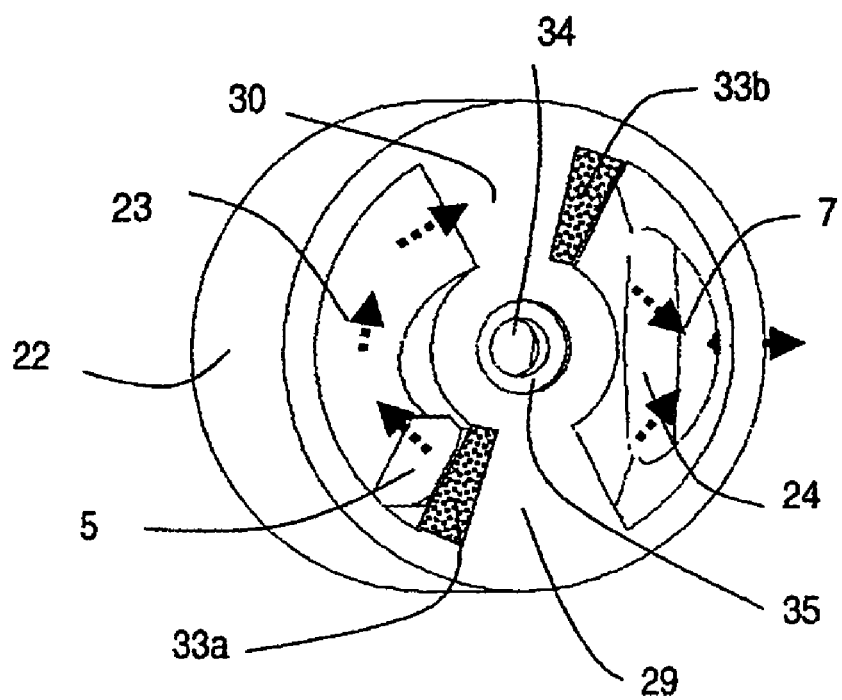
(b)
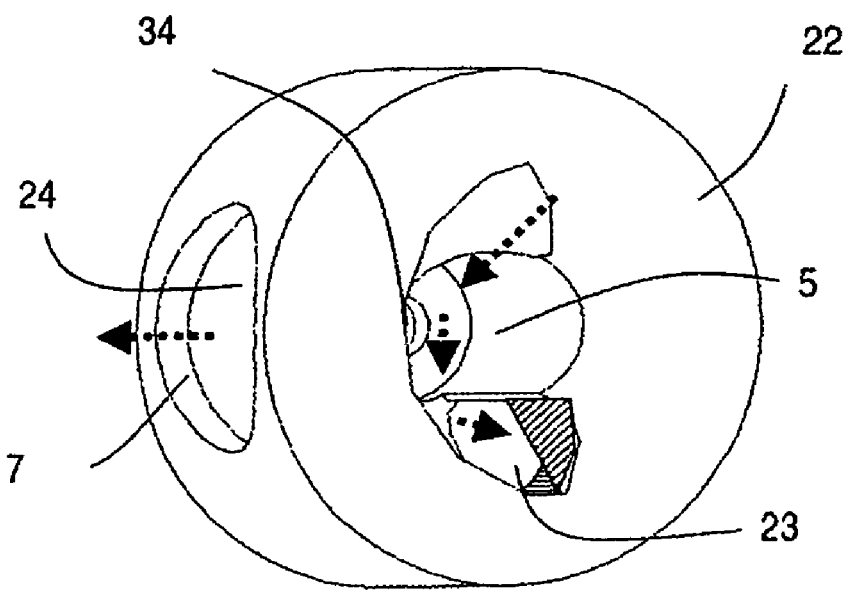

PRESSURE EXCHANGER

CROSS REFERENCE TO RELATED APPLICATIONS

This application claims priority to provisional application No. 60/599,760, entitled "Pressure Exchanger" filed Aug. 10, 2004, the disclosure of which is hereby incorporated by reference in its entirety.

FIELD OF THE INVENTION

The invention relates to a pressure exchanger for transfer of pressure energy from one fluid flow to another, contained inside a pressure vessel with inlet and outlets for each fluid flow in communication through a rotor with multiple through-going coaxial ducts and arranged for rotation through its longitudinal axis between opposing end covers guiding fluid exchange of a first and second fluid stream within and external of the rotor.

BACKGROUND AND DESCRIPTION OF THE RELATED ART

Commercial pressure exchangers of the above-mentioned category are known to exhibit operational flow limitations due to excessive noise, flow resistance, intermixing and cavitation despite the application of above mentioned patents. Furthermore, the manufacturing of certain parts requires extreme and costly tolerances and limited choice of materials due to asymmetric elastic deformations.

U.S. Pat. No. 4,887,942 to Hauge, hereby incorporated by reference in its entirety, describes a principle for self-rotation by fluid streams that is based on the so called lift and drag principle, where the rotor duct walls act as hydrofoils. The trailing section of the rotor duct exposed to the exit flow of the low-pressure fluid is under cavitation risk at high flow velocities and therefore a limiting factor for unit flow capacity.

U.S. Pat. No. 5,988,993 to Hauge, hereby incorporated by reference in its entirety, describes a positioning system of a rotor that requires extremely tight tolerances for the mating of the rotor and the outer bearing sleeve, which makes manufacturing costly. Furthermore, the hydrostatic bearing principle requires high degree of filtration as fluid is bled from the fluid stream under high pressure and passed through the radial rotor/sleeve clearances in a dead-end mode. This may cause silting and blockage of rotor under certain circumstances and applications. The outer sleeve also prevents rotor OD from being sized according to end cover OD or pressure vessel ID, and therefore limits efficiency and capacity further.

U.S. Pat. No. 6,540,487 to Polizos et al. describes a pressure transfer mechanism that seeks to avoid the sudden depressurization of the high-pressure fluid and destructive cavitation and noise. However, in reality it is only partially successful as cavitation damage is moved to the connecting channel and away from the exit edge of the end cover port.

U.S. Pat. No. 6,659,731 to Hauge, hereby incorporated by reference in its entirety, describes returning depressurized fluid through the center of the rotor to induce unnecessary flow resistance with lower efficiency resulting. The pressure vessel described has multiple external seals, which eventually will leak and require replacement causing operational interruption and costly service.

SUMMARY OF THE INVENTION

Thus, there is a need for a pressure exchanger that ameliorates at least some of the above-noted disadvantages of existing pressure exchangers. Thus, at least one objective of the invention is to provide a pressure exchanger that is not encumbered by the aforementioned disadvantages.

In accordance with at least one embodiment of this invention, a pressure exchanger having increased flow capacity and start momentum is provided. The pressure exchanger according to this embodiment utilizes the one-side unidirectional impulse momentum principle for self-rotation that is less susceptible to cavitation.

In accordance with at least one embodiment of this invention, a pressure exchanger is configured to exhibit increased flow capacity along with improved operational and manufacturing efficiency. The pressure exchanger according to this embodiment comprises a center axle for rotor positioning along with a full diameter sized rotor.

In accordance with at least one embodiment of this invention a pressure exchanger having improved depressurization and pressurization of rotor ducts is provided. The pressure exchanger according to this embodiment comprises a geometry controlled decrease of end cover clearance in the direction of rotation for achieving this improved performance.

In accordance with at least one embodiment of this invention, a pressure exchanger is configured to be less susceptible to substantial or asymmetric deformation of the end cover axle is provided. By complete force balancing through an area exposed to high pressure positioned substantially opposite to the centroid of the separation force of each end-cover. The pressure exchanger according to this embodiment is able to achieve equivalent or improved performance and allow the use of materials other than ceramics and a larger length/diameter ratio for the rotor.

In accordance with at least one embodiment of this invention, a pressure exchanger having a reduced potential for leakage is provided. The pressure exchanger according to this embodiment comprises a single external seal.

At least one embodiment of the invention may provide a pressure exchanger for transferring pressure energy from a first fluid flow to a second fluid flow. The pressure exchanger according to this embodiment may comprise a substantially cylindrical-shaped pressure vessel, a pair of end covers located on opposing ends of the pressure vessel, each end cover having at least one passage formed therein, a rotor, disposed inside the vessel, comprising multiple through-going coaxial ducts and arranged for rotation about a longitudinal axis between the pair of opposing end covers, the rotor adapted to guide fluid exchange both within and external to the rotor, a pair of fluid inlets, and a pair of fluid outlets in communication with the fluid inlets to promote a first fluid flow and a second fluid flow through the rotor, wherein the opposing end cover passages on a fluid inlet side are oriented with a degree of inclination to impart a unirotational impulse momentum onto the rotor regardless of flow direction of the first and second fluid flows relative to the pressure vessel through an inlet tangential flow vector component in the direction of rotation and an outflow tangential flow vector component in an opposite direction of rotation At least one other embodiment according to the invention may provide a bidirectional pressure exchanging device for exchanging pressure from one fluid flow to another fluid flow. The pressure exchanging device according to this embodiment may comprise a pressure vessel, a pair of end covers disposed on opposing ends of the pressure vessel, each end cover having at least one fluid passage formed therein, a rotor, located inside the pressure vessel, comprising multiple through-going coaxial ducts and arranged for rotation about its longitudinal axis between the pair of opposing end covers, the rotor guiding fluid exchange both within and external to the rotor, a first substantially axial fluid flow path perpendicular to a plane of rotor rotation comprising an inlet and outlet communicating through the rotor, and a second fluid flow path that is at least in part parallel to the first fluid flow path through and around the rotor and that comprises an inlet and outlet that are substantially perpendicular to the first fluid flow path, wherein the opposing end cover fluid passages are oriented on an inlet side with a degree of inclination to impart a uni-rotational impulse momentum onto the rotor regardless of flow direction through an inlet tangential flow vector component in the direction of rotation and an outflow tangential flow vector component in an opposite direction of rotation.

Yet at least one additional embodiment according to this invention may comprise a reverse osmosis system for desalinating sea water. The system according to this embodiment may comprise a fresh water supply, a sea water supply, a membrane separating the fresh water supply from the sea water supply, wherein the sea water supply is maintained at a pressure against the membrane sufficient to reverse an osmotic tendency of fresh water to flow into the sea water, and a pressure exchanger for increasing a pressure of sea water feed to the reverse osmosis system, the pressure exchanger, comprising a substantially cylindrical-shaped pressure vessel, a pair of end covers located on opposing ends of the pressure vessel, each end cover having at least one passage formed therein, a rotor, disposed inside the vessel, comprising multiple through-going coaxial ducts and arranged for rotation about a longitudinal axis between the pair of opposing end covers, the rotor adapted to guide fluid exchange both within and external to the rotor, a pair of fluid inlets, and a pair of fluid outlets in communication with the fluid inlets to promote a first fluid flow and a second fluid flow through the rotor, wherein the opposing end cover passages on a fluid inlet side are oriented with a degree of inclination to impart a uni-rotational impulse momentum onto the rotor regardless of flow direction of the first and second fluid flows relative to the pressure vessel through an inlet tangential flow vector component in the direction of rotation and an outflow tangential flow vector component in an opposite direction of rotation These and other embodiments and advantages of the present invention, which may be employed individually or in selective combination, will become apparent from the following detailed description, taken in conjunction with the accompanying drawings, illustrating by way of example the principles of the invention.

BRIEF DESCRIPTION OF THE DRAWINGS

FIGS. 2(a) and 2(b) are partial and full cut-away perspective views of the pressure exchanger and components of the pressure exchanger according to the exemplary embodiment illustrated in FIG. 1;

FIG. 3 is a force vector diagram illustrating the impulse momentum principle for self-rotation;

FIGS. 4(a) and 4(b) are schematic diagrams illustrating the geometry effecting controlled pressure change in the sealing area of a pressure exchanger according to at least one embodiment of the invention;

FIGS. 5(a) and 5(b) are partial cut-away perspective views of a pressure exchanger end cover according to at least one embodiment of the invention.

DESCRIPTION OF THE PREFERRED EMBODIMENTS

The following description is intended to convey a thorough understanding of the embodiments described by providing a number of specific embodiments and details involving an improved pressure exchanger for transferring pressure energy from one fluid flow to another. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Figure 1:
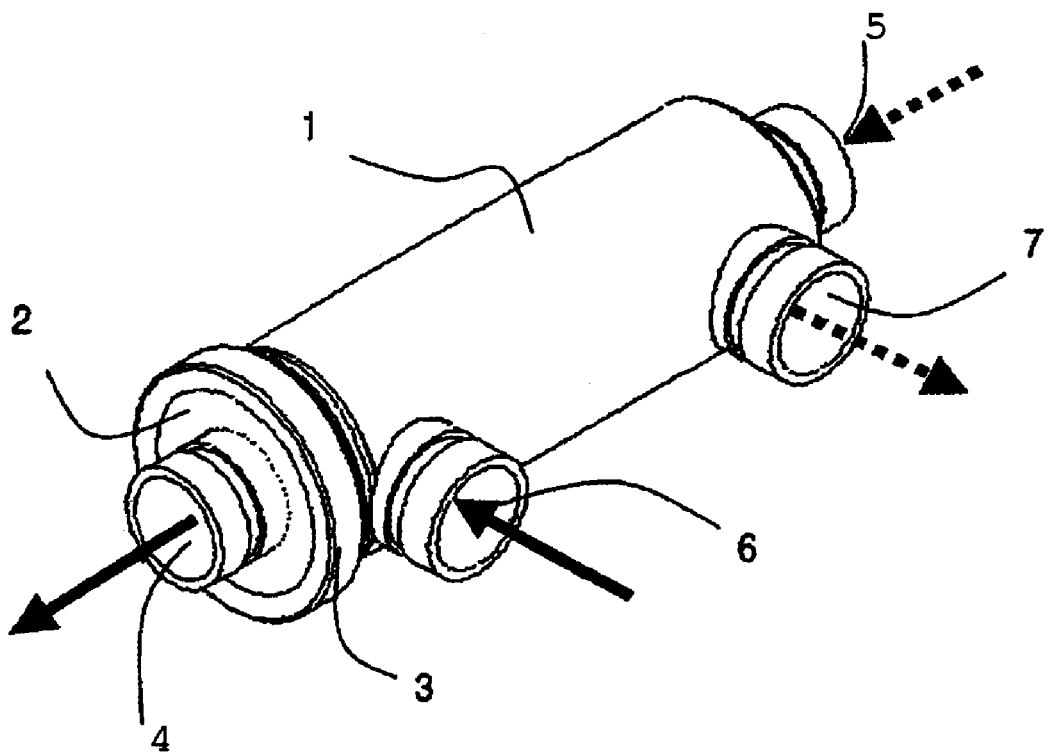
FIG. 1 is an external perspective view of a pressure exchanger according to at least one embodiment of the invention.

Referring now to FIG. 1, an external embodiment of a pressure exchanger according to at least one embodiment of the invention is illustrated. The pressure exchanger depicted in FIG. 1 comprises a pressure vessel 1 with a removable end cap or end cover 2 having a low-pressure fluid outlet 4 and secured with a lock ring 3 providing an entrance where an internal assembly may be inserted. In the opposite end a fluid inlet 5 for low pressure is located and additionally fluid inlet 6 and outlet 7 for high pressure fluid flows are aligned essentially normal to pressure vessel 1.

FIG. 2a shows the different components of the internal assembly, where a rotor 8 with circular shaped ducts 10 uses a hollow central axle 9 with a through going tension rod 11 for positioning, bearing function and mounting. Each end of the tension rod 11 goes through the center face of each end cover 21, 22 and is secured with a nut 12 and voucher 13 in a central recess. A bushing 14 fitted in a recess of each end cover and each end of the central axle 9 provides firm center fixation of the rotor assembly.

The first high-pressure outlet stream 7 communicates directly with and pressurizes the rotor vessel clearance 15, which is isolated from the high-pressure inlet stream 6 through an O-ring seal 16. In various embodiments, the high pressure outlet stream 7 may be the less contaminating flow, such as feed water in a reverse osmosis ("RO") plant allowing only feed water to leak into the second low pressure reject stream 5.

The various embodiments of the invention may have particular utility in an RO fresh water recovery plant in which salt water is pumped through an osmotic membrane submerged in fresh water at a pressure sufficient to reverse the osmotic effect of fresh water flowing into the salt water.

Each end cover 21, 22 has a balancing area 18 pressurized by the high pressure streams equal to the difference between a low pressure counter area 20 slightly offset from the center of the end covers and the full end cover back side area confined by the seal 19 that faces the removal end cap 2 and a fixed end face of the opposing low pressure inlet 4. The first stream end cover 22 has a low pressure port 23 and a high pressure port 24 and the second stream end cover 21 has a high pressure inlet port 25 and a low pressure outlet port 26.

FIG. 2b shows an elevated surface 27 that may be incorporated in the end faces of the rotor 8 or end covers 21, 22. If the rotor 8 is made of a brittle material such as ceramic, it is advantageous to keep the material under compression by the high pressure externally. However, this can increase the chance that, due to the counteracting streams through the ducts, the rotor will assume a position where the outer sealing area is brought to a non-parallel contact with the low-pressure side of the opposing end cover. Such a positioning is known to induce asymmetric opposing clearance pressure gradients leading to a force on the rotor normal to the contacting or touched end cover which in turn causes lock-up that prevents start-up rotation. This will induce lower mean pressure in the clearance 28 of the contacting end as the low pressure will creep towards the contact boundary as it provides more resistance to the inward leakage flow. The elevated surface feature 27 will restrict rotor axial movement and avoid touch down between end cover surface and outer rotor rim. Due to external pressurization there are no pressure gradients on the high-pressure side causing potential lock-up.

Another way of preventing this lock-up potential is to use a rotor material that can be put under tension by a complete external depressurization and hence there will be no pressure gradient at the low-pressure side clearances. Due to the outward leakage flow from high pressure ports 24 and 25, the pressure gradients will seek to center the rotor 8 thereby reducing, and ideally, preventing the potential for lock-up in this configuration.

FIG. 3 is a force vector diagram illustrating the impulse momentum principle for self-rotation. The diagram illustrates the principle flow arrangement of the first and second stream in a tangential cross-section where a rotor duct 10 has a tangential velocity in the plane of rotation similar to the tangential inlet velocity component of the first incoming low pressure stream. The relationship between the tangential velocity $(V_r)$ and the tangential inlet velocity $(V_{y\ in})$ is characterized in equation 1 below:

$$V_r \approx V_{y\ in} \quad (1)$$

A general concept of the pressure exchanger according to the various embodiments of the invention is to induce the incoming flow through an inclination that essentially induces little or no rotational momentum to the rotor 8. The coaxial inlet velocity component inside the duct $(V_{x\ in})$ is essentially similar to the duct velocity component $(V_d)$ and is characterized in relation to the duct velocity by equation 2 below:

$$V_{x\ in} \approx V_d \quad (2)$$

The outflow of the second stream $(V_{y\ out})$ through outlet port 26 is essentially responsible for imparting rotational momentum to the rotor 8 as the tangential velocity component is reversed. See equation 3 below:

$$V_{y\ out} \approx -V_{y\ in} \quad (3)$$

The rotational momentum is characterized by equation 4, wherein $F_y t$ is the impulse in the y direction and $[(MV_y)_{out} - (MY_y)_{in}]$ is the change in y-directed momentum, $$F_y t = (MV_y)_{out} - (MY_y)_{in} \quad (4)$$

while the tangential velocity component $(V_{x\ in})$ remains unchanged:

$$V_{x\ in} \approx V_d \approx V_{x\ out} \quad (5)$$

Although the drawings indicate similar inclination of both inflow and outflow low pressure ports, it will be understood that this depends on the relationship that may be required or preferable between the rotor's RPM and its frictional resistance to rotation.

It should be appreciated that in various embodiments, and in certain applications, the pressure exchanger high and low pressure sides may be switched. Further, it should be appreciated that the high-pressure flow imparts the rotational momentum through similar port geometry, although this may require additional changes with respect to balancing of the separation force acting between end covers and rotor.

FIGS. 4a and 4b show the geometry effecting controlled pressure change in the sealing area of the end cover. Although the figures show the interaction between rotor ducts and port openings at one end, it is envisioned that the particular feature preferably is incorporated with both end covers.

FIG. 4a shows the initial phase of the depressurizing duct 10a having entered from the high-pressure port in to the sealing area 29 with its trailing edge 31a completely inside of it. Sealing areas 29 and 30 have generally flat surfaces with sloped surfaces 33a and 33b, respectively although slope surface 33b is not critical. The leading edge 32a is about to enter a sloped surface 33a giving increasing clearance as it moves towards the low-pressure port 23, while maintaining fixed clearance for its trailing edge 31a. Although the drawing shows the pressurizing duct 10b and its trailing and leading edges 31b, 32b entering the sealing area 30 from the low pressure port 23 simultaneously, it may preferably be with a sufficient time difference to avoid resonating pressure pulsations. In various embodiments, this may be arranged through manipulation of the number of ducts or through manipulation of the port angular asymmetry. The remaining sealing area 30 of duct 10b may have a slope 33b towards the high-pressure port.

It is important to understand that the depressurization area 33a must produce a resistance factor prohibiting cavitation velocities of the exit leakage flow in the clearance while the pressurization area 33b is not under a similar constraint.

FIG. 4b shows the second phase of the depressurizing duct 10a having entered from the high pressure port in to the sealing area 29 with its trailing edge 31a still inside of it while the leading edge 32a has entered the sloped surface 33a giving increasing clearance as it moves towards the low pressure port 23, while still maintaining fixed clearance for its trailing edge 31a. The pressurization duct 10b is shown in a similar position where the fluid is building up pressure in a controlled manner while dissipating pressure energy that otherwise would have produced strong pressure waves and excessive noise when entering the high pressure port.

FIG. 5a shows the rotor of front face of the non-momentum imparting end cover 22 guiding a first or pressure-less stream entering through Inlet 5 to a low pressure port 23 into rotor ducts and obtaining partial high pressure as the duct moves across the sealing area 30 and full pressure at the exit of the sloped area 33b to high pressure port 24. The first stream exits at high pressure without imparting any rotational momentum through outlet 7. The remaining fluid volume in the duct is partially depressurized while passing sealing area 29 and at complete low pressure upon the duct passes the sloped area 33a. The end cover is further equipped with a central bore 34 for a tension rod and a recess 35 for a center bushing.

FIG. 5b shows the back face of end cover 22 where the first stream enters through a central inlet 5 also giving access to the nut and voucher of the tension rod and thereafter flows into the low pressure port 23. The first stream exits at high pressure from port 24 through the outlet 7.

Although the end covers are essentially left and right versions or mirror images of each other, the inventive configuration is not so limited and it does not preclude individual features of the opposite end covers, such as port wall inclination, to be substantially different from each other in order to satisfy requirements created by other constraints or preferences in the overall design and function of the invention or particular application.

Figure 6:
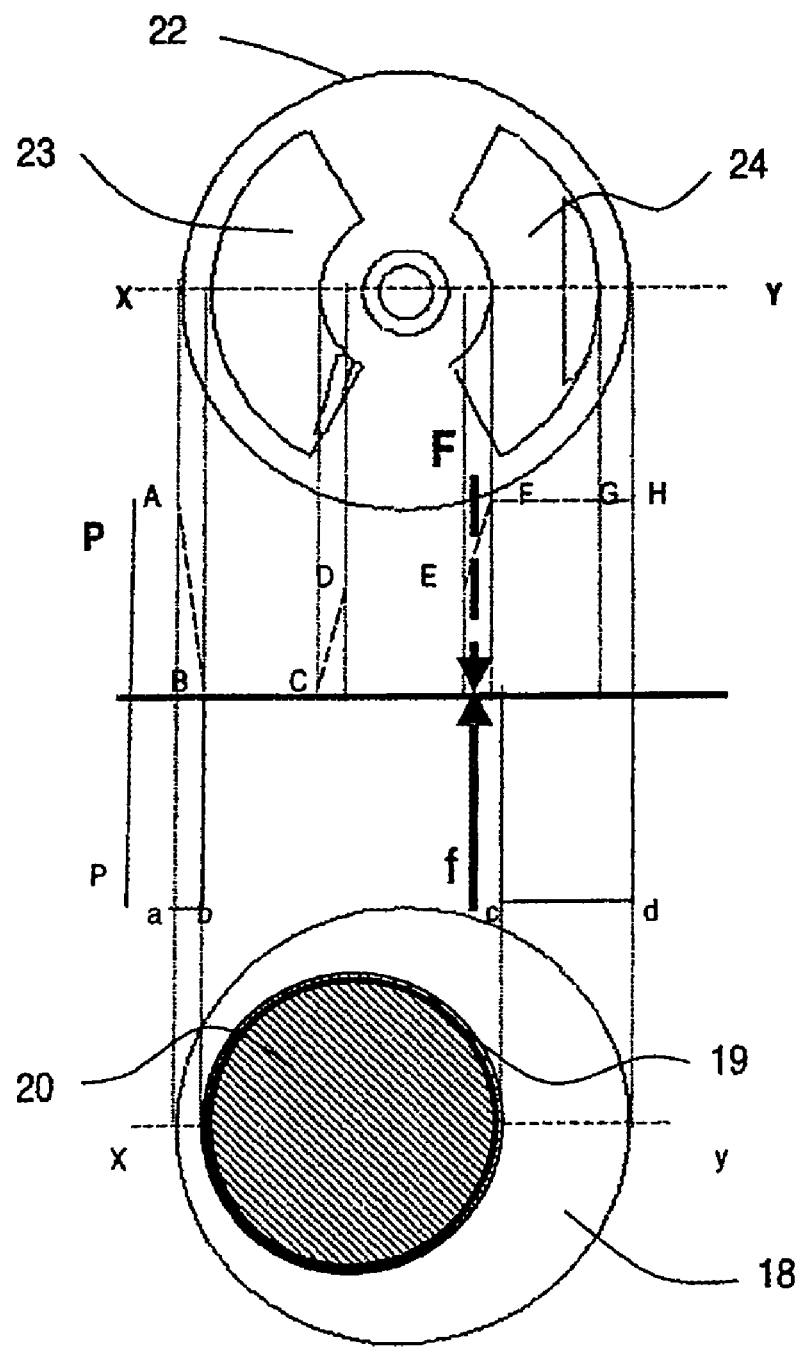
FIG. 6 is a force vector diagram illustrating the forces acting on the end covers and the counteracting balancing forces in a pressure exchanger according to at least one embodiment of the invention.

FIG. 6 shows the dynamics of balancing the separation force between end covers and rotor. The leakage flows between end cover sealing areas and rotor follow a certain pressure gradient as indicated where: A-B indicates a drop from the external rotor clearance space 15 to the low pressure port area 23; C-D indicates a pressure increase from low pressure of port area B-C to intermediate pressure in an external groove of the axle 9 while D-E represents the uniform force area created by the clamping force of the nut and voucher on the tension rod; E-F indicates the full pressure increase from the groove and to the high pressure port; and F-G-H represents the uniform high pressure level of port 24 and the external clearance space 15. The diagram shows the pressure gradient as it is across the symmetry line X-Y and the resulting pressure force from all areas may be substituted by one force F located at the centroid of total force.

The back side of the end cover is defined by a symmetry line x-y and associated pressure gradient line a-b-c-d and a force balancing area 18 under full high pressure and a low pressure counter area 20 confined by a seal 19 creating a substitute force C, sized and positioned to equalize the opposing separation force F.

The embodiments of the present inventions are not to be limited in scope by the specific embodiments described herein. For example, although many of the embodiments disclosed herein have been described, in particular configurations, the principles of the invention herein described are equally applicable to other configurations. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A pressure exchanger for transferring pressure energy from a first fluid flow to a second fluid flow, comprising:

a substantially cylindrical-shaped pressure vessel;

a pair of end covers located on opposing ends of the pressure vessel, each end cover having at least one passage formed therein;

a rotor, disposed inside the vessel, comprising multiple through-going coaxial ducts and arranged for rotation about a longitudinal axis of the exchanger between the pair of opposing end covers, the rotor adapted to guide fluid exchange both within and external to the rotor;

a pair of fluid inlets; and a pair of fluid outlets in communication with the fluid inlets to promote a first fluid flow and a second fluid flow through the rotor, wherein the opposing end cover passages pass low pressure fluids and are oriented with a degree of inclination with respect to the longitudinal axis to impart a uni-rotational impulse momentum onto the rotor regardless of flow direction of the first and second fluid flows relative to the pressure vessel, through an inlet tangential flow vector component in the direction of rotation and an outflow tangential flow vector component in an opposite direction of rotation, wherein the rotor rotates about a central axle with each axle end affixed to the opposing end covers.

2. The pressure exchanger according to claim 1, wherein the second fluid flow enters and exits the pressure exchanger in opposite directions while imparting essentially no rotational momentum on the rotor.

3. The pressure exchanger according to claim 1, wherein the surface of each end cover that faces away from the rotor has an area subject to high pressure giving a normal pressure force substantially equal to a separating force between end cover and rotor with their respective force centroids co-aligned.

4. The pressure exchanger according to claim 1, wherein the end covers are configured as substantially opposed mirror images of each other.

5. The pressure exchanger according to claim 1, wherein each axle end is affixed to the opposing end covers with a central tension rod removably attached to at least one of the end covers.

6. The pressure exchanger according to claim 1, wherein at least one of the rotor and the end covers is equipped with an elevated central surface area preventing a rotor outer sealing area from acquiring a lock up position.

7. The pressure exchanger according to claim 1, wherein at least one end cover is adapted for depressurization and pressurization of rotor duct fluid over extended angular movement, the at least one end cover having at least one of either a curved end cover or stepped end cover geometry starting at the point where the duct opening is located in a sealing area and thereon forming a controlled increase of duct leading edge clearance in the direction of rotation.

8. The pressure exchanger according to claim 1, wherein the pressure vessel has coaxial flow passages leading into a sealed balancing chamber located asymmetrically with direct opening to end cover ports having inclined passages.

9. The pressure exchanger according to claim 1, wherein non-impulse imparting flow streams enter and exit the pressure vessel substantially radially in the same direction of a common co-axial plane.

10. The pressure exchanger according to claim 1, wherein the pressure vessel has at least one end configured with a removable end closure allowing for insertion or removal of at least one pressure exchanger component.

11. The pressure exchanger according to claim 1, further comprising a seal disposed between an end cover and an internal wall of the pressure vessel between its side opening and a rotor end.

12. The pressure exchanger according to claim 1, wherein the rotor vessel clearance is able to be pressurized either directly from the high pressure streams, by internal rotor end clearance leakage or the space is depressurized directly from the low pressure side.

13. The pressure exchanger according to claim 1, wherein the pressure vessel comprises a means for monitoring rotational speed of the rotor.

14. The pressure exchanger according to claim 13, wherein the means for monitoring comprises a transparent window.

15. The pressure exchanger according to claim 14, wherein the means for monitoring comprises a reflecting surface for permitting optical measurement of the rotational speed visible through the transparent window.

16. The pressure exchanger according to claim 1, wherein the pair of opposing end covers have ports of different and uneven angular extent.

17. The pressure exchanger according to claim 1, wherein the inlet tangential flow vector component in the direction of rotation and the outflow tangential flow vector component in an opposite direction of rotation are related by the expression $V_y$ out$\approx -V_y$ in.

18. A bidirectional pressure exchanging device for exchanging pressure from one fluid flow to another fluid flow, comprising:
   a pressure vessel;
   a pair of end covers disposed on opposing ends of the pressure vessel, each end cover having at least one fluid passage formed therein;
   a rotor, located inside the pressure vessel, comprising multiple through-going coaxial ducts and arranged for rotation about its longitudinal axis between the pair of opposing end covers, the rotor guiding fluid exchange both within and external to the rotor, wherein the rotor rotates about a central axle with each axle end affixed to the opposing end covers;
   a first substantially axial fluid flow path perpendicular comprising an inlet and outlet communicating through the rotor; and
   a second fluid flow path that is at least in part parallel to the first fluid flow path through and around the rotor and that comprises an inlet and outlet that are substantially perpendicular to the first fluid flow path,
   wherein the opposing end cover fluid passages pass low pressure fluids and are oriented with a degree of inclination to impart a uni-rotational impulse momentum onto the rotor regardless of flow direction of the first and second fluid flows, through an inlet tangential flow vector component in the direction of rotation and an outflow tangential flow vector component in an opposite direction of rotation.

19. A reverse osmosis system for desalinating sea water comprising:
   a fresh water supply;
   a sea water supply;
   a membrane separating the fresh water supply from the sea water supply, wherein the sea water supply is maintained at a pressure against the membrane sufficient to reverse an osmotic tendency of fresh water to flow into the sea water; and
   a pressure exchanger for increasing a pressure of sea water fed to the reverse osmosis system, the pressure exchanger, comprising:
   a substantially cylindrical-shaped pressure vessel;
   a pair of end covers located on opposing ends of the pressure vessel, each end cover having at least one passage formed therein;
   a rotor, disposed inside the vessel, comprising multiple through-going coaxial ducts and arranged for rotation about a longitudinal axis of the exchanger between the pair of opposing end covers, the rotor adapted to guide fluid exchange both within and external to the rotor;
   a pair of fluid inlets; and
   a pair of fluid outlets in communication with the fluid inlets to promote a first fluid flow and a second fluid flow through the rotor, wherein the opposing end cover passages pass low pressure fluids and are oriented with a degree of inclination with respect to the longitudinal axis to impart a uni-rotational impulse momentum onto the rotor regardless of flow direction of the first and second fluid flows relative to the pressure vessel, through an inlet tangential flow vector component in the direction of rotation and an outflow tangential flow vector component in an opposite direction of rotation, wherein the rotor rotates about a central axle with each axle end affixed to the opposing end covers.

* * * * *